(12) United States Patent
Furuya et al.

(10) Patent No.: US 6,730,172 B2
(45) Date of Patent: May 4, 2004

(54) CHUCKING DEVICE

(75) Inventors: Kenji Furuya, Numazu (JP); Akira Ohkawa, Numazu (JP); Shoji Tatejima, Fuji (JP); Yoshihiro Yamaguchi, Suntoh-gun (JP); Masayuki Terayama, Tagata-gun (JP)

(73) Assignee: Ricoh Company, Ltd., Tokyo (JP)

( * ) Notice: Subject to any disclaimer, the term of this patent is extended or adjusted under 35 U.S.C. 154(b) by 175 days.

(21) Appl. No.: 09/970,855

(22) Filed: Oct. 5, 2001

(65) Prior Publication Data

US 2002/0040681 A1 Apr. 11, 2002

(30) Foreign Application Priority Data

Oct. 6, 2000 (JP) ........................................ 2000-307696

(51) Int. Cl.[7] .............................................. B05C 13/00
(52) U.S. Cl. ....................................... 118/500; 118/423
(58) Field of Search ............................... 279/2.17, 2.1; 269/48.1, 47, 27, 48.3; 294/98.1; 118/500, 503, 423, DIG. 11, DIG. 12

(56) References Cited

U.S. PATENT DOCUMENTS

| | | |
|---|---|---|
| 2,749,133 A | 6/1956 | Rich |
| 3,026,115 A | 3/1962 | Brauer, Jr. et al. |
| 5,282,888 A | * 2/1994 | Fukawa et al. ............. 118/500 |

FOREIGN PATENT DOCUMENTS

| | | |
|---|---|---|
| DE | 44 08 469 | 9/1995 |
| GB | 2 128 115 | 4/1984 |
| JP | 60-249518 | * 12/1985 |

OTHER PUBLICATIONS

Patent Abstract of Japan, JP 60–249518, Dec. 10, 1985.

* cited by examiner

*Primary Examiner*—Brenda A. Lamb
(74) *Attorney, Agent, or Firm*—Oblon, Spivak, McClelland, Maier & Neustadt, P.C.

(57) ABSTRACT

A chucking device of the present invention includes an annular elastic member sandwiched between an upper and a lower member. A rod is slidable up and down in a bore formed in the upper and lower members and is partly positioned in the elastic member. The rod presses the elastic member radially outward when raised or lowered, thereby causing the chucking device to chuck a hollow, cylindrical base. The elastic member contacts the inner periphery of the base over a minimum of area and surely, closely contacts it for thereby implementing desirable sealing. The chucking device can therefore form a uniform film on the outer periphery of the base.

22 Claims, 9 Drawing Sheets

CHUCKING DEVICE

BACKGROUND OF THE INVENTION

1. Field of the Invention

The present invention relates to a chucking device for chucking a work implemented as a hollow, cylindrical member.

2. Description of the Background Art

A chucking device including an elastic member that inflates when filled with compressed air or compressed liquid is conventional. Assume that the chucking device is applied to the production of a photoconductive element for electrophotography. Then, the chucking device chucks the hollow, cylindrical base of the photoconductive element with the elastic member being inflated and pressing itself against the inner periphery of the base. The chucking device then dips the base in a coating liquid to thereby uniformly coat the former with the latter. To insure high-quality images free from irregular density and background contamination, it is necessary to prevent compressed air inside the elastic member from leaking to a space in the lower portion or the upper portion of the base. It is also necessary to cause the elastic member to closely contact the inner periphery of the base for thereby surely sealing the inside of the base.

Japanese Patent Laid-Open Publication No. 4-4034, for example, teaches a chucking device including a rubber sack. The rubber sack is inserted into a hollow, cylindrical base and then inflated by compressed air, contacting substantially the entire inner periphery of the base except for the bottom opening of the base. Japanese Patent Publication No. 7-38964 discloses a chucking device including an upper and a lower pressing member having tapered surfaces facing each other. The upper and lower pressing members crush an annular elastic member and thereby cause the elastic member to press itself against the inner periphery of a hollow, cylindrical base.

The chucking device taught in the above Laid-Open Publication No. 4-4034 has some problems left unsolved, as will be described hereinafter. The rubber sack is expected to press itself against substantially the entire inner periphery of a hollow, cylindrical base. Therefore, a long period of time is necessary to check whether or not the rubber sack is defective, making maintenance inefficient. During usual, dip coating process (e.g., continuous coating of a first pallet to a tenth pallet), the rubber sack whose thermal conductivity is low covers substantial the area of the inner periphery of the base except for the bottom opening. Therefore, when the base is lifted out of the coating liquid, the coating liquid evaporates and takes heat from the base and film formed thereon. This heat is accumulated in the rubber sack with the result that the surface temperature of the base sequentially decreases from the first pallet to the tenth pallet, causing the temperature of the coating liquid to drop. Consequently, the viscosity of the coating liquid and therefore the thickness of the film increases. That is, the cooling of the chucking device itself brings about this problem.

The chucking device taught in Publication No. 7-38964 is free from the cooling problem because it contacts the inner periphery of the base over a minimum of area. However, the chucking device crushes the annular elastic member and therefore accelerates the deterioration of the elastic member, i.e., limits the life of the elastic member. Moreover, the upper and lower pressing members are pressed against the elastic member by springs, causing the elastic member to deform. This, however, cannot surely cause the elastic member to closely contact the inner periphery of the base.

SUMMARY OF THE INVENTION

It is an object of the present invention to provide a chucking device minimizing an area over which an annular elastic member contacts the inner periphery of a hollow, cylindrical base and causing the elastic member to surely contact the above inner periphery and insure sealing, thereby insuring uniform film thickness.

A chucking device of the present invention includes an annular elastic member sandwiched between an upper and a lower member. A rod is slidable up and down in a bore formed in the upper and lower members and is partly positioned in the elastic member. The rod presses the elastic member radially outward when raised or lowered, thereby causing the chucking device to chuck a hollow, cylindrical base. The elastic member contacts the inner periphery of the base over a minimum of area and surely, closely contacts it for thereby implementing desirable sealing. The chucking device can therefore form a uniform film on the outer periphery of the base.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
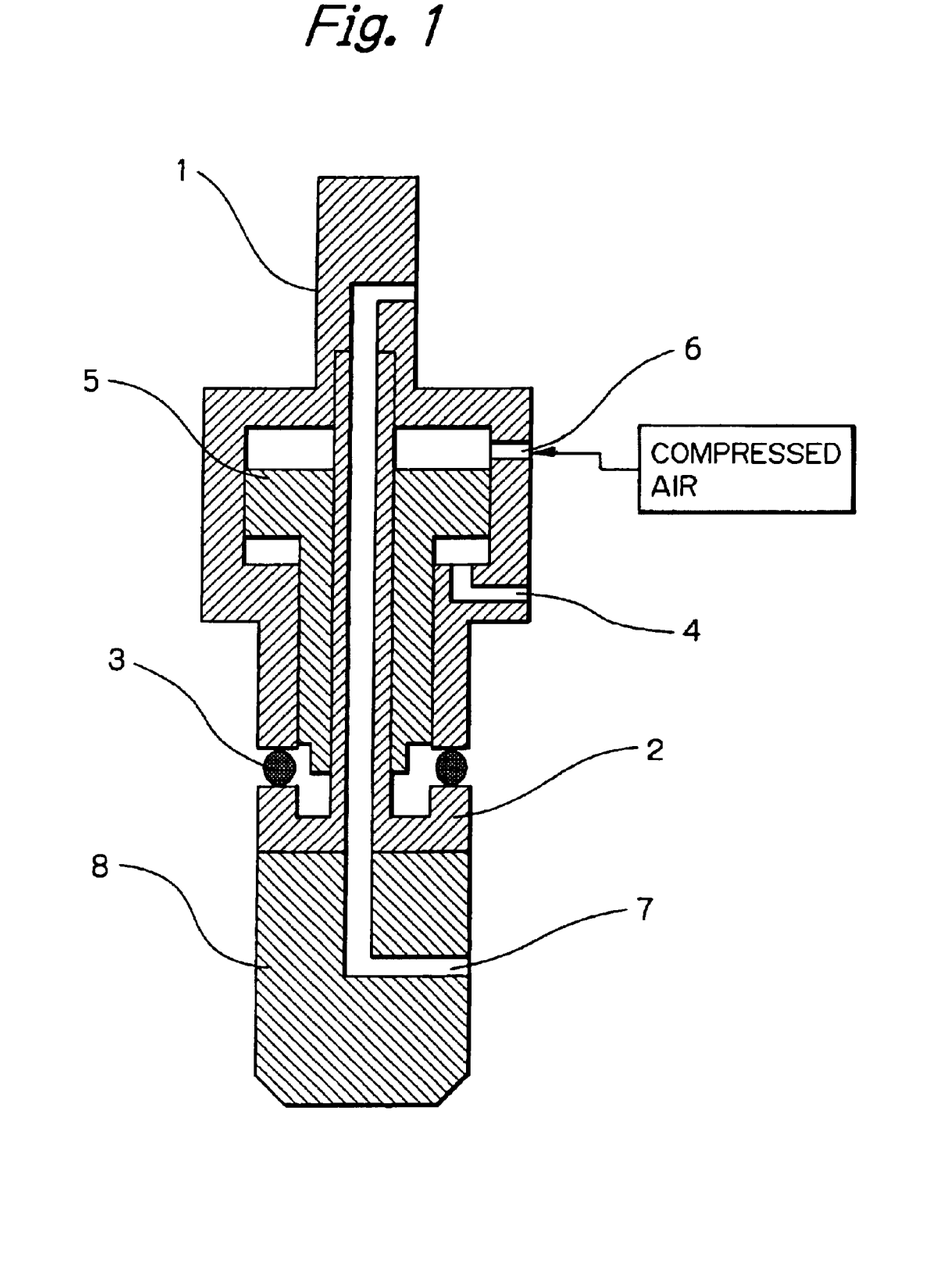
FIG. 1 is a view showing a chucking device embodying the present invention.

Referring to FIG. 1 of the drawings, a chucking device embodying the present invention is shown. As shown, the chucking device includes an elastic ring or annular member 3, an upper member 1, and a lower member 2. The upper member 1 and lower member 2 sandwich the elastic ring 3 to thereby hold the ring 3 at a preselected position. A rod 5 is disposed in a bore formed in the upper member 1 and lower member 2 and slidable up and down. At least part of the rod 5 is positioned in of the elastic ring 3. When the rod 5 is lowered, it presses the elastic ring 3 radially outward and thereby causes the ring 3 to hermetically press itself against the inner periphery of a hollow, cylindrical base not shown. As a result, the chucking device chucks the base. The rod 5 is raised when the chucking device should release the base. If desired, the chucking device may be configured to chuck the base when the rod 5 is raised or releases it when the rod 5 is lowered.

More specifically, air passages 4 and 6 are formed in the upper member 1. Compressed air is selectively fed to either one of the air passages 4 and 6 in order to move the rod 5 upward or downward. Compressed air may, of course, be replaced with a spring, a hydraulic pressure or a manual force or even a combination thereof. Compressed air, in particular, simplifies the mechanism and easily moves the rod 5 up and down.

Figure 2A:
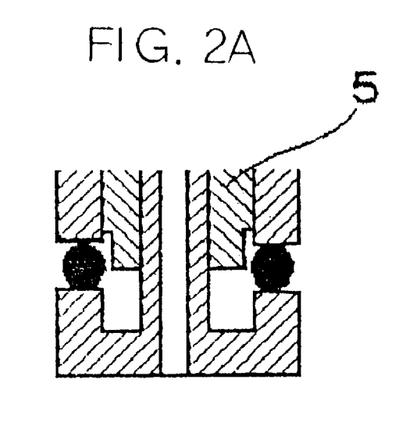
FIGS. 2A and 2B are views showing a specific configuration of a rod included in the illustrative embodiment.
Figure 2B:
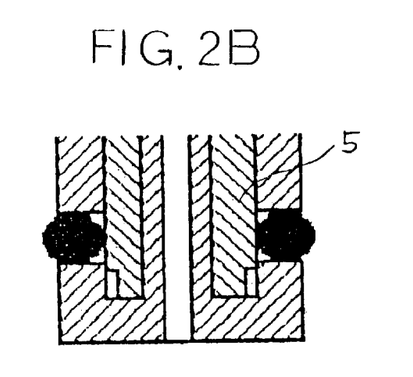
Figure 3A:
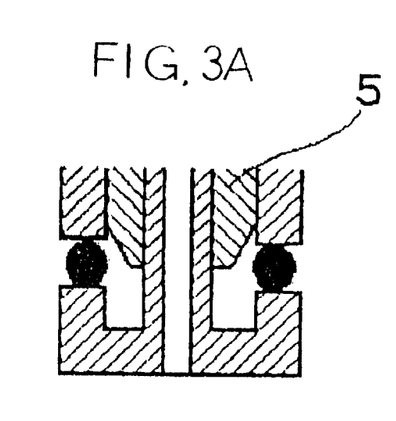
FIGS. 3A and 3B are views showing another specific configuration of the rod.
Figure 3B:
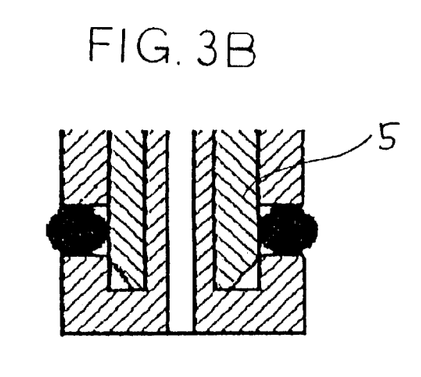

The upper end and lower end of the rod 5 are different in outside diameter from each other. For example, as shown in FIGS. 2A and 2B, the rod 5 has a stepped lower end. When the rod 5 with the stepped lower end is lowered from the position of FIG. 2A to the position of FIG. 2B, the rod 5 presses the elastic ring 3 radially outward. Alternatively, as shown in FIGS. 3A and 3B, the rod 5 may be provided with a tapered lower end. When the rod 5 with the tapered lower end is lowered from the position on FIG. 3A to the position of FIG. 3b, the rod presses the elastic ring 3 radially outward.

Figure 4:
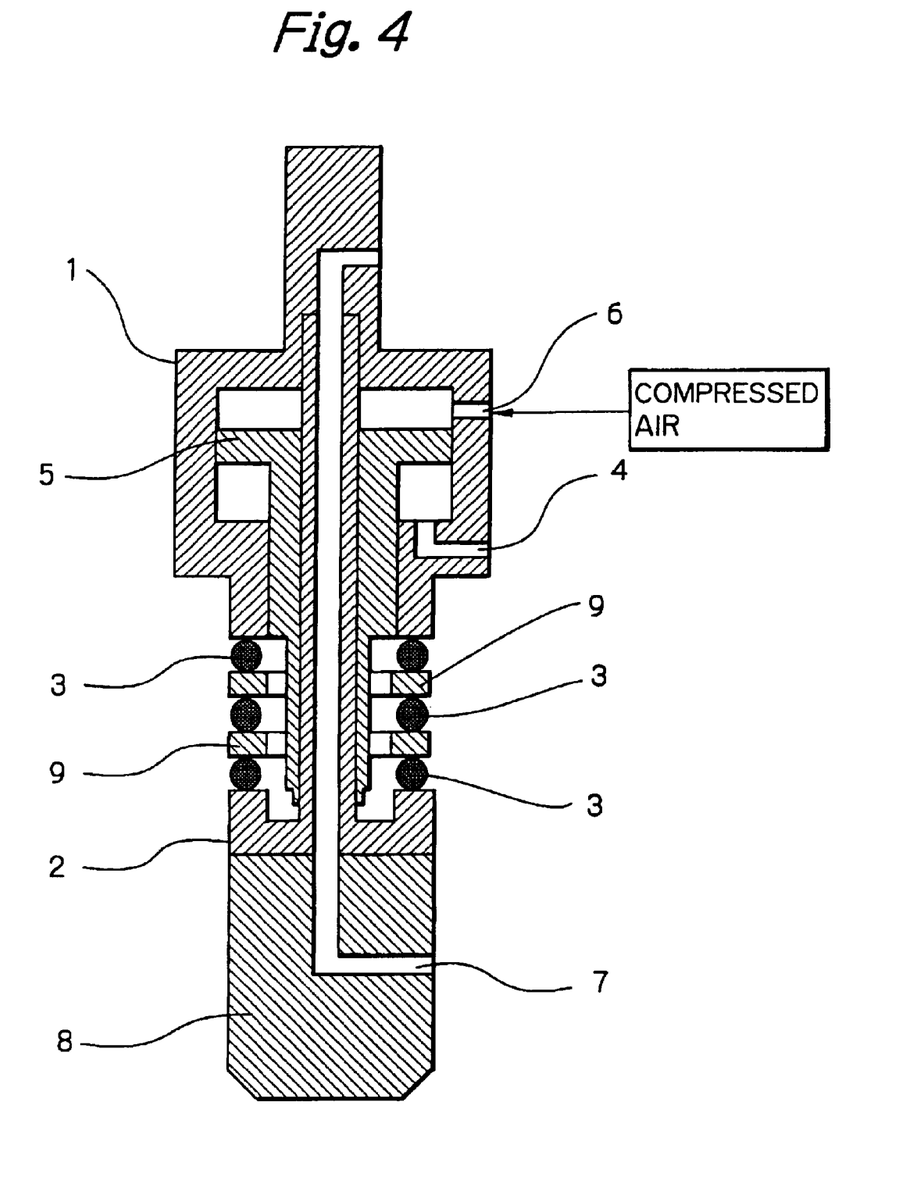
FIG. 4 is a view showing a modification of the illustrative embodiment.

As shown in FIG. 4, an intermediate member 9 may be positioned between the upper and lower members 1 and 2 in order to hold a plurality of elastic rings 3. This allows the chucking device to chuck the base more positively.

A rod 8 smaller in outside diameter than the base is affixed to the bottom of the lower member 2. When the chucking device is inserted into the base, the rod 8 serves as a guide. When the chucking device is used to chuck the hollow, cylindrical base of a photoconductive element for electrophotography, the rod 8 serves not only as a guide but also as a member for reducing a space.

Further, as shown in FIG. 1 or 4, an air discharge passage 7 is formed throughout the upper member 1, lower member 2 and rod 8. When the chucking device chucks a photoconductive element and dips it in a coating liquid, air inside the hermetic space of the base of the photoconductive element flows out via the air discharge passage 7 without flowing into the coating liquid. Air flown into the coating liquid would cause a solvent contained in the liquid to evaporate and rise in the form of bubbles and disturb the liquid surface and therefore a film formed on the photoconductive element.

The hollow, cylindrical base may be implemented as a drum formed of aluminum, copper, iron, zinc, nickel or similar metal or a paper sheet or a plastic or glass plate. Aluminum, copper, gold, silver, platinum, palladium, titanium, nickel-chromium, stainless steel, copper-indium or similar metal may be deposited on the base by vapor deposition. Alternatively, indium oxide, tin oxide or similar conductive metal oxide may be deposited on the base by vapor deposition. Further, metal foil may be laminated on the base. Moreover, carbon black, indium oxide, tin oxide-antimony powder, metal powder or copper iodide may be dispersed in a binding resin and then applied to the base.

Further, the surface of the base or conductive support may be subjected to oxidation, chemicals processing, coloring or similar processing so long as it does not effect image quality. An under layer may be formed between the conductive support and a charge generation layer. In the event of charging, the under layer prevents a charge from being injected from the conductive support to a photoconductive layer. At the same time, the under layer plays the role of an adhesive layer for retaining the photoconductive layer integrally with the conductive support. In addition, the under layer intercepts reflection from the conductive support. The under layer may be formed of any suitable resin, e.g., polyethylene, propylene, acrylic resin, metacrylic resin, polyamide resin, vinyl chloride resin, vinyl acetate resin, phenol resin, epoxy resin, polyester resin, alkyd resin, polycarbonate, polyurethane, polyimide resin, vinylidene chloride resin, polyvinyl acetal resin, vinyl chloride-vinyl acetate copolymer, polyvinyl alcohol, water-soluble polyester, nitrocellulose, casein or gelatin.

When the laminate of the photoconductive element includes the under layer, use may be made of blade coating, wire-bar coating, spray coating, dip coating, bead coating, air-knife coating, curtain coating or similar conventional coating method.

As for the charge generation layer, a conventional charge generating substance (carrier generating substance) may be dissolved or dispersed in a solvent together with a suitable binder resin and with or without a charge transport substance (carrier transport substance) and then coated. The charge generating substance may be selected from a group of peryllen pigments including monoazo pigment, disazo pigment, peryllen acid anhydride and poryllene acid amide, a group of indigo pigments including indigo and thioindigo, a group of polycyclic quinones including anthraquinone and pyrenequinone, a group of phthalocyanine pigments including quinacrydone pigment, bisbenzoimidazole pigment, metal phthalocyanine and non-metallic phthalocyanine, an eutectoid complex of pyrillium salt pigment or thiapyrillium salt pigment and bolycarbonate.

To disperse the charge generating substance in rein, use may be made of ball mill dispersion or sand mill dispersion. The charge generation substance should preferably have a volume mean grain size of 5 $\mu$m or less, more preferably 2 $\mu$m or less or most preferably 0.5 $\mu$m or less. For the dispersion, use may be made of one or more of conventional organic solvents including methanol, ethanol, n-propanol, benzyl alcohol, methyl cellosolve, ethyl cellosolve, acetone, methylethyl ketone, methylisopropyle ketone, cyclohexane, acetic acid methyl, dioxane, tetrahydrofurane, ethylene chloride, chloroform 1,2-dichloroethane, monocholorbenzene and xylene.

The charge transport layer is implemented by a suitable binder containing a charge transporting substance. The charge transport substance may be implemented by one or more of conventional ones. Conventional charge transporting substances include a group of oxadiazole derivatives including 2,5-bis(p-diethylaminophenyl)-,3,4-oxadiazole, a group of pyrazoline derivatives including 1,3,5-triphenyl-pyrazoline and 1-[pyridyl-(2)]-3-(p-diethylaminostyryl)-5-(p-diethylaminophenyl) pyrazoline, a group of aromatic triamino compounds including triphenylamine, stryryltriphenylamine and dibenzylanyline, a group of aromatic tridiamino compounds including N,N'-diphenyl-N,N'-bis(3-methylphenyl)-1,1-biphenyl-4,4' diamine, 1,2,4-triazine derivatives including 3-(4'-dimethylaminophenyl)-5,6-di-(4'-methoxyphenyl)-1,2,4-triazine, hydrozone derivatives including 4-diethylaminobenzaldehyde-1,1-dipheylhydrazone, quinazoline derivatives including 2-phenyl-4-styryl-quinazoline, benzofuran derivatives including 6-hydroxy-2,3-di (p-methoxyphenyl)-benzofuran, α-stilbene derivatives including p-(2,2-dipheylvinyl)-N,N-dipheylaniline, enemine derivatives, N-ethylcarbazole and other carbazol derivatives, poly-N-vinylcarbazole and other poly-N-vinylcarbazoles and derivatives thereof and poly-γ-carbazole ethylglutanate and derivatives thereof, which are taught in "Journal of Imaging science" 29:7–10 (1985), pyrene, polyvinylpyrene, polyvinylantracene, polyvinylacrydine, poly-9-biphenylantracene, pyrene-formaldehyde resin, and ethylcarbazol formaldehyde resin.

For the binding resin of the charge transport layer, use may be made of any one of conventional resins including polycarbonate resin, polyester resin, methacrylic resin, acrylic resin, polyvinyl chloride resin, polyvinylidene chloride resin, polystyrene resin, polyvinyul acetate resin, buthylene-butadien copolymer, vinylidene chloride-acrylonitrile copolymer, vinyl chloride-acetic vinyl coploymer, vinyl chloride-anhydride maleic acid copolymer, silicone resin, silicone-alkyd resin, phenol-formaldehyde resin, styrene-alkyd resin, and poly-N-vinylcarbazole. Two or more of such resins may be combined together.

As for a solvent for forming the charge transport layer, one or more of conventional organic solvents may be combined. The organic solvents include a group of aromatic hydrocarbons including benzene, toluene, xylene and chlorobenzene, ketones including acetone and 2-butanone, halgenated fatty hydrocarbons including methylene chloride, chloroform and ethylene chloride, and cyclic or straight chain ethers including tetrahydrofuran and ethylether.

Specific examples of the coating liquids will be described hereinafter.

1. Coating Liquid for under Layer 5 parts by weight of soluble Nylon (ARAMINE CM-800 available from TORAY INDUSTRIES INC.), and 95 parts by weight of methanol were dissolved to prepare a coating liquid for the under layer.

2. Coating Liquid for Charge Generation Layer 10 parts by weight of a charge generating agent, 7 parts by weight of polyvinyl butyral and 145 parts by weight of tetrahydrofuran were milled in a ball bill for 72 hours. The above charge generating substance had the following formula:

(1)

Subsequently, 200 parts by weight of tetrahydrofuran was added to the above mixture and then and then dispersed for 1 hour. The resulting mixture was further diluted by tetrahydrofuran to thereby prepare a coating liquid.

3. Coating Liquid for Charge Transport Layer 7 parts by weight of a charge transporting agent, 10 parts by weight of polycarbonate (PANLITE available from TORAY (?)) and 83 parts by weight of dichloromethane were dissolved to prepare a coating liquid. The charge transporting agent had the following formula:

(2)

A hollow, cylindrical base formed of aluminum and having an outside diameter of 30 mm and a length of 340 mm was dipped in the coating liquid for the under layer to thereby coat the base with the liquid. Subsequently, the charge generation layer (CGL) and charge transport layer (CTL) were sequentially formed on the under layer by dipping, thereby completing a sample of the laminate, photoconductive element.

More specifically, a first pallet to a tenth ballet of photoconductive elements each having the above dimensions were processed by dipping. The charge transport layer was 25 $\mu$m thick. The thickness of the charge transport layer was measured over the portion of the hollow, cylindrical base between the upper end portion (10 mm from the upper end) and the lower end portion (10 mm from the lower end).

Figure 5:
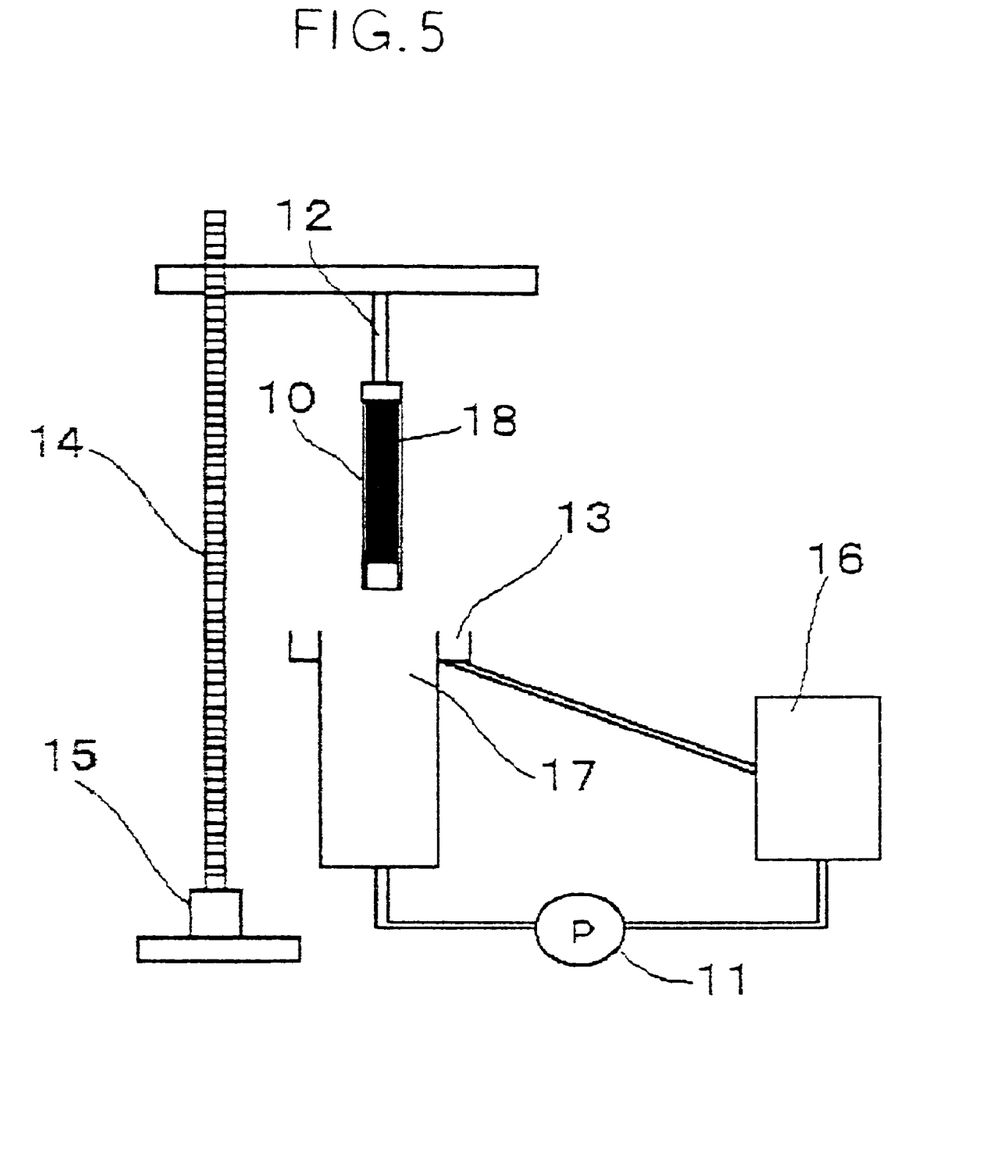
FIG. 5 is a view showing a comparative example of a chucking device applied to a dip coating system.
Figure 6:
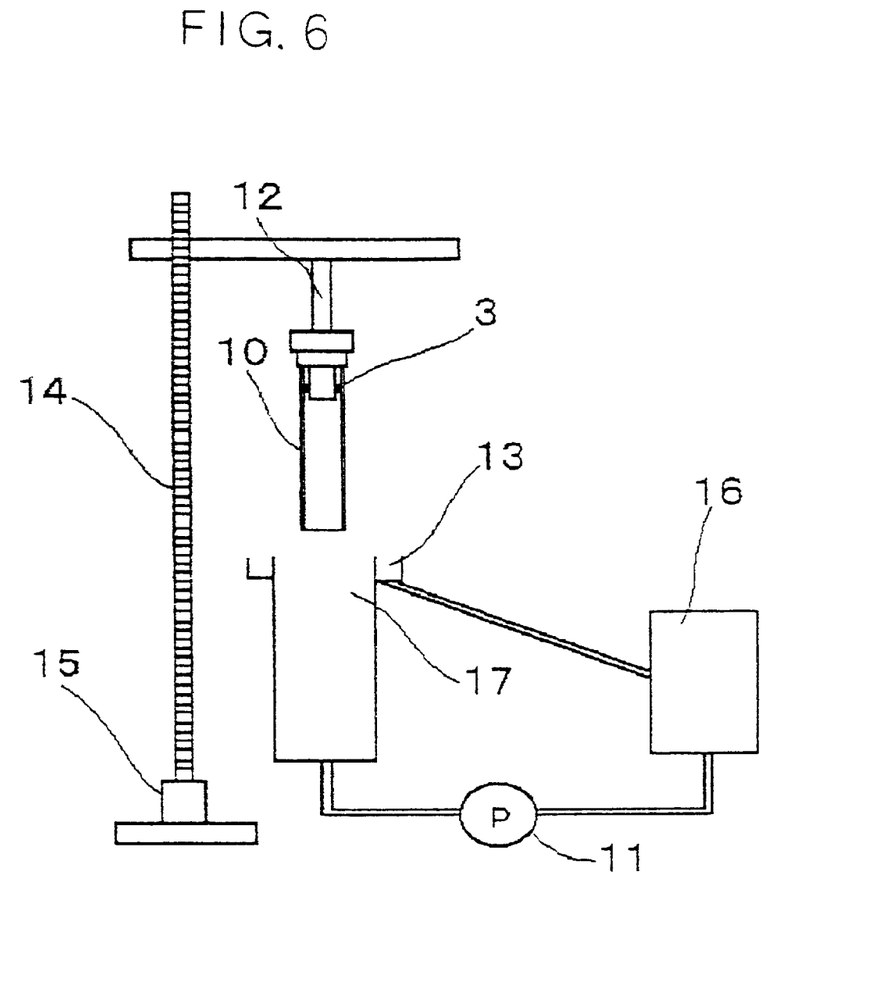
FIG. 6 is a view showing the illustrative embodiment applied to the same dip coating system, but lacking part thereof.
Figure 7:
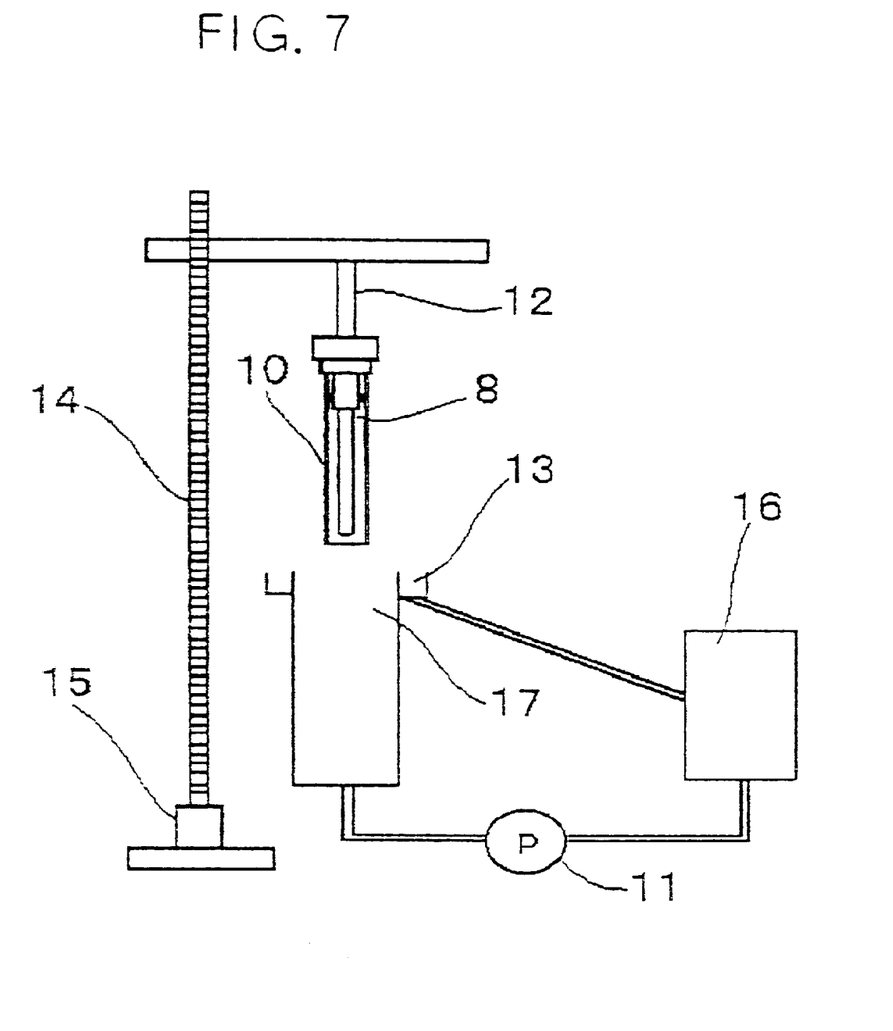
FIG. 7 is a view showing the illustrative embodiment applied to the same dip coating system.

A first example of illustrative embodiment lacking the rod 8, FIG. 1, and a second example of the illustrative embodiment including the rod 8 were respectively applied to coating systems shown in FIGS. 6 and 7, respectively. FIG. 5 shows a comparative example in which a chucking device included a rubber sack configured to closely contact the entire inner periphery of a hollow, cylindrical base except for the lower end portion. In FIGS. 5 through 7, the reference numerals 10, 11, 12 and 13 respectively designate a hollow cylindrical base, a pump, a chucking device, and an overflow receiver. Further, the reference numerals 14, 15, 16, 17 and 18 respectively designate an elevation screw, an elevation motor, a coating tank a coating bath, and a rubber sack.

Figure 8:
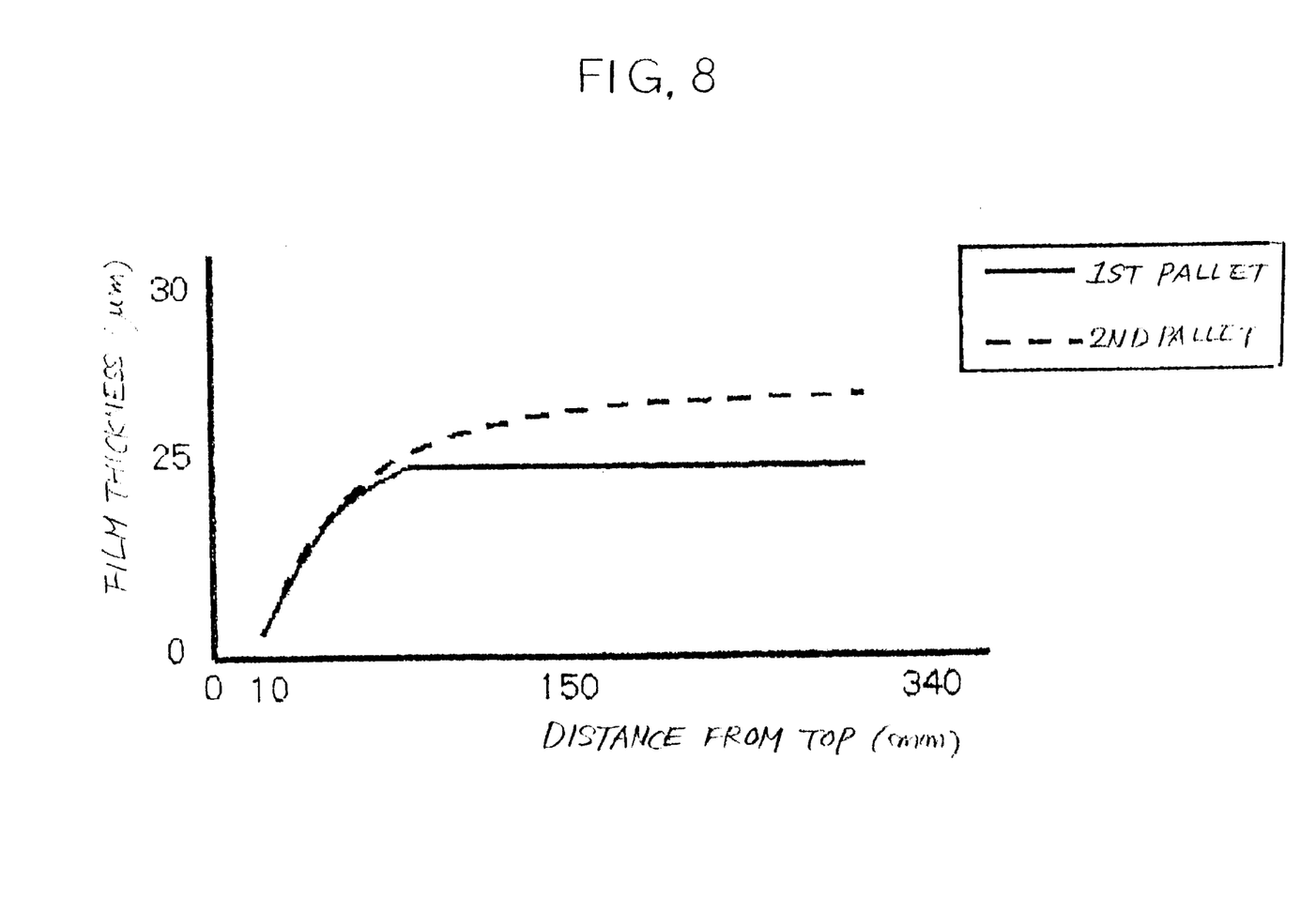
FIG. 8 is a graph showing a film thickness distribution measured in the condition shown in FIG. 5.
Figure 9:
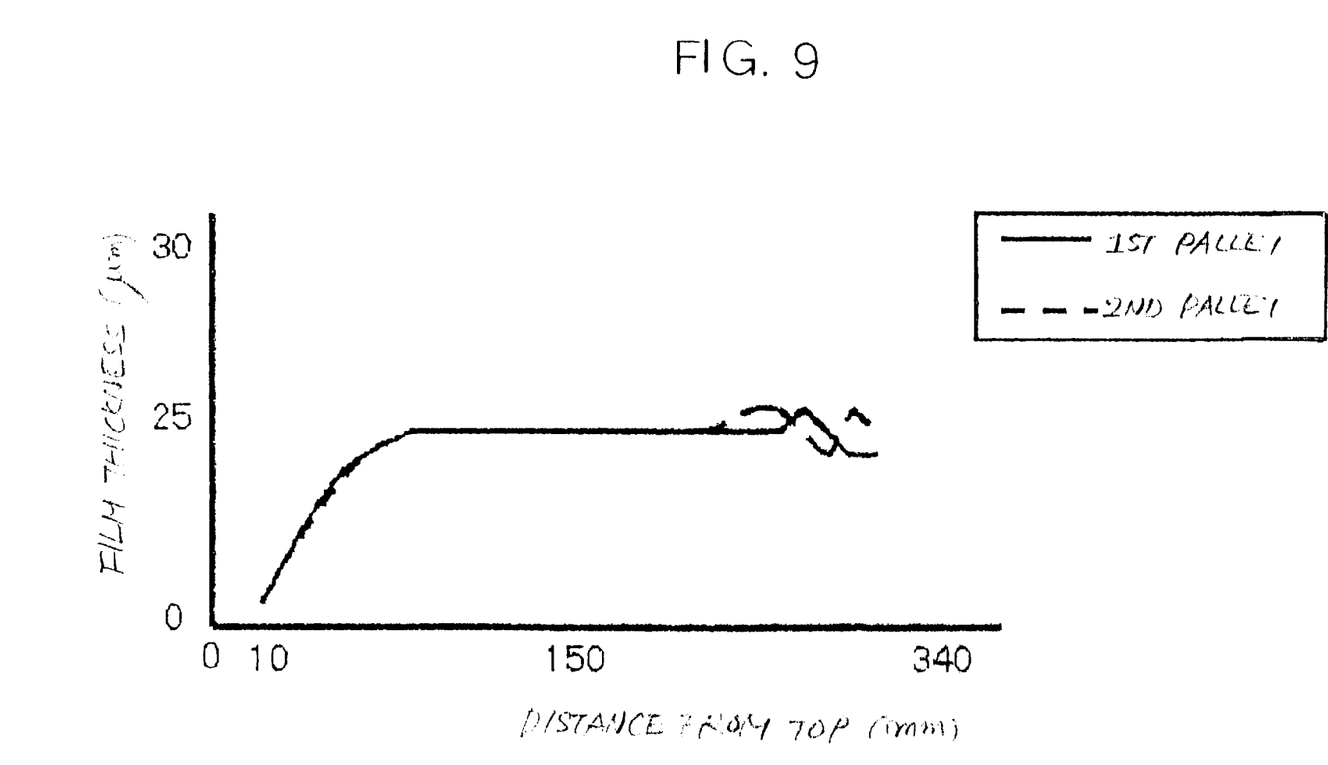
FIG. 9 is a graph showing a film thickness distribution measured in the condition shown in FIG. 6.
Figure 10:
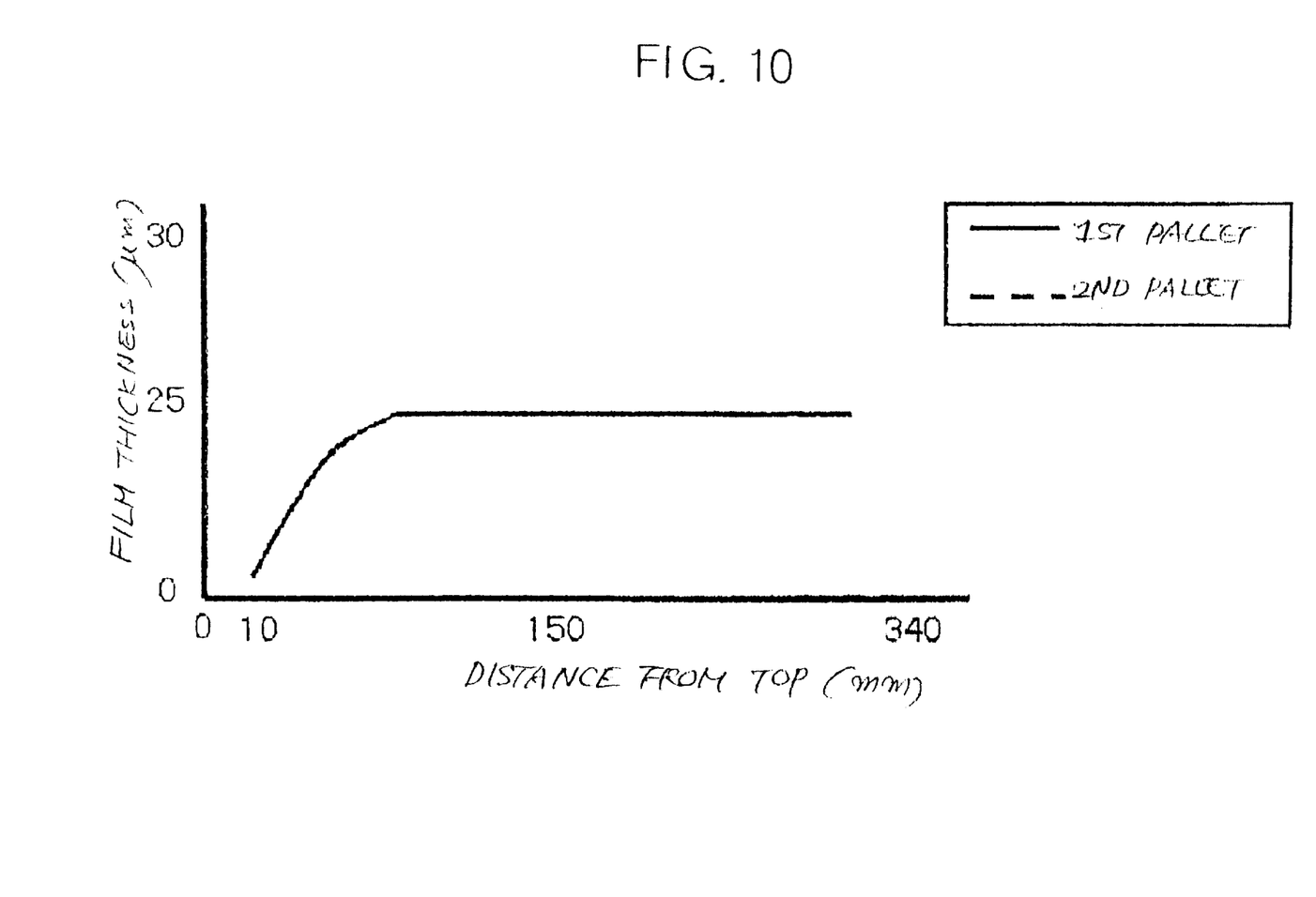
FIG. 10 is a graph showing a film thickness distribution measured in the condition shown in FIG. 7.

FIG. 9 shows the result of measurement effected with the first example of the illustrative embodiment while FIG. 10 shows the result of measurement effected with the second example of the same. FIG. 8 shows the result of measurement effected with the comparative example. As shown, the chucking device shown in FIG. 6 provided the first pallet to the tenth pallet with the same film thickness because it did not cooled them off. However, because the space within the base was broad, the vapor of the solvent filled the space and rose in the form of bubbles when the base was lifted out of the coating liquid. The bubbles caused the liquid surface to move. As a result, the film thickness was irregular in the lower portion of the base.

By contrast, the chucking device shown in FIG. 7 provided the first pallet to the tenth pallet with the same film thickness, and in addition insured uniform film thickness even in the lower portion of the base.

The chucking device shown in FIG. 5 provided the tenth pallet with greater film thickness than the first pallet. This is presumably because the chucking device and therefore the surface of the base was cooled off as the coating operation proceeded to the tenth pallet. When the base so cooled off was dipped in the coating liquid, it lowered the temperature of the liquid as well to thereby increase the viscosity of the liquid and therefore the thickness of the film.

It will therefore be seen that the chucking device of the illustrative embodiment provides the base with a uniform film free from irregularity.

As stated above, in accordance with the present invention, an elastic ring or annular elastic member contacts the inner periphery of a hollow, cylindrical base over a minimum of area and surely, closely contacts it for thereby implementing desirable sealing. This realizes a chucking device capable of forming a uniform film on the outer periphery of the base.

Various modifications will become possible for those skilled in the art after receiving the teachings of the present disclosure without departing from the scope thereof.

What is claimed is:

1. A chucking device comprising:
   an annular elastic member;
   an upper member and a lower member respectively positioned above and below said elastic member to thereby hold said elastic member therebetween; and
   a rod slidable in an up-and-down direction in a bore formed in said upper member and said lower member;
   wherein at least part of said rod is positioned in said elastic member and presses, when raised or lowered, said elastic member radially outward to thereby chuck a hollow, cylindrical base to be chucked.

2. The device as claimed in claim 1, including compressed air means for causing said rod to move in the up-and-down direction.

3. The device as claimed in claim 2, wherein said rod has an upper end and a lower end different in diameter from each other.

4. The device as claimed in claim 3, further comprising an intermediate member intervening between said upper member and said lower member to thereby hold a plurality of elastic rings.

5. The device as claimed in claim 4, wherein the lower end of said lower member has a smaller outside diameter than the upper end.

6. The device as claimed in claim 5, wherein said chucking device is used for a system for producing a photoconductive element for electrophotography.

7. The device as claimed in claim 6, further comprising an air discharge passage for discharging air inside a hermetic space of the hollow, cylindrical base, which is dipped in a coating liquid, without causing said air from flowing into said coating liquid.

8. The device as claimed in claim 1, wherein said rod has an upper end and a lower end different in diameter from each other.

9. The device as claimed in claim 8, further comprising an intermediate member intervening between said upper member and said lower member to thereby hold a plurality of elastic rings.

10. The device as claimed in claim 9, wherein the lower end of said lower member has a smaller outside diameter than the upper end.

11. The device as claimed in claim 10, wherein said chucking device is used for a system for producing a photoconductive element for electrophotography.

12. The device as claimed in claim 11, further comprising an air discharge passage for discharging air inside a hermetic space of the hollow, cylindrical base, which is dipped in a coating liquid, without causing said air from flowing into said coating liquid.

13. The device as claimed in claim 1, further comprising an intermediate member intervening between said upper member and said lower member to thereby hold a plurality of elastic rings.

14. The device as claimed in claim 13, wherein the lower end of said lower member has a smaller outside diameter than the upper end.

15. The device as claimed in claim 14, wherein said chucking device is used for a system for producing a photoconductive element for electrophotography.

16. The device as claimed in claim 15, further comprising an air discharge passage for discharging air inside a hermetic space of the hollow, cylindrical base, which is dipped in a coating liquid, without causing said air from flowing into said coating liquid.

17. The device as claimed in claim 1, wherein the lower end of said lower member has a smaller outside diameter than the upper end.

18. The device as claimed in claim 17, wherein said chucking device is used for a system for producing a photoconductive element for electrophotography.

19. The device as claimed in claim 18, further comprising an air discharge passage for discharging air inside a hermetic space of the hollow, cylindrical base, which is dipped in a coating liquid, without causing said air from flowing into said coating liquid.

20. The device as claimed in claim 1, wherein said chucking device is used for a system for producing a photoconductive element for electrophotography.

21. The device as claimed in claim 20, further comprising an air discharge passage for discharging air inside a hermetic space of the hollow, cylindrical base, which is dipped in a coating liquid, without causing said air from flowing into said coating liquid.

22. The device as claimed in claim 1, further comprising an air discharge passage for discharging air inside a hermetic space of the hollow, cylindrical base, which is dipped in a coating liquid, without causing said air from flowing into said coating liquid.

* * * * *